No. 819,503. PATENTED MAY 1, 1906.
V. E. BELLEDIN.
TIRE FOR VEHICLE WHEELS.
APPLICATION FILED NOV. 16, 1905.
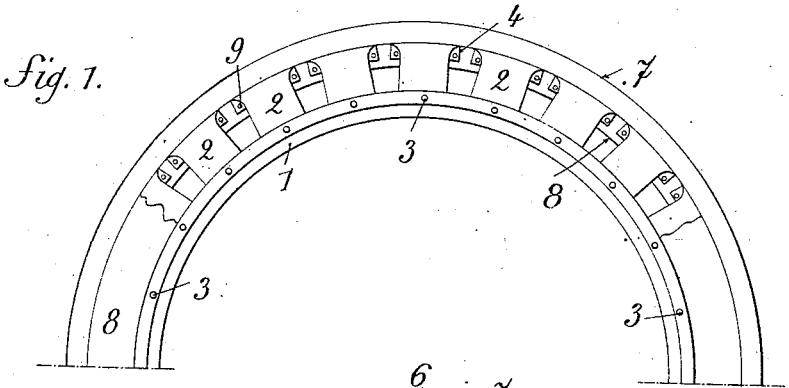
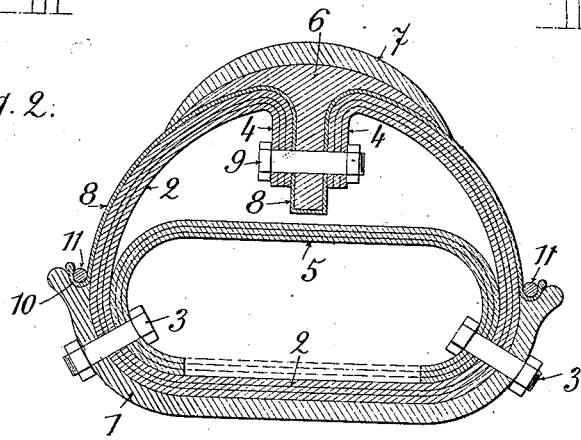
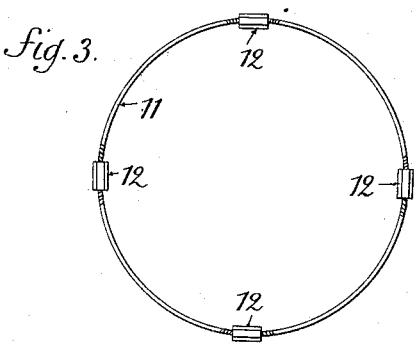
WITNESSES:
George G. Schoenlank
W. H. Berrigan
INVENTOR,
VICTOR EDOUARD BELLEDIN.
BY H. van Olsdennel
HIS ATTORNEY.

UNITED STATES PATENT OFFICE.

VICTOR EDOUARD BELLEDIN, OF PARIS, FRANCE.

TIRE FOR VEHICLE-WHEELS.

No. 819,503.　　　Specification of Letters Patent.　　　Patented May 1, 1906.

Application filed November 16, 1905. Serial No. 287,560.

*To all whom it may concern:*

Be it known that I, VICTOR EDOUARD BELLEDIN, engineer, a citizen of the Republic of France, residing at 160 Rue du Faubourg St. Honoré, Paris, France, have invented certain new and useful Improvements in Tires for Vehicle-Wheels, of which the following is a specification.

This invention relates to the tires of wheels, and has for its object to so construct a tire or rim that it shall be flexible and applicable to all kinds of vehicle-wheels.

The said tire or rim comprises a series of springs secured to the periphery of a rigid felly, each of the said springs being curved symmetrically in a diametrical plane and having its ends curved the one toward the other at the outside of the tire, then bent inward in order to hold or maintain between them a continuous rubber or other elastic rim constituting the tread portion of the tire. Within the said springs are secured other smaller and what I call "deadening" springs bent into C or O shape and so arranged that the inwardly-bent ends of the first-named springs will bear on the same when the pressure of the tire on the ground is greater than a certain amount. The springs are protected against dirt by a continuous cover, which may be secured to the edges of the felly by means of wire rods or rings.

The accompanying drawings show by way of example one embodiment of this invention.

Figure 1 is an elevation of a portion of the tire, the cover being removed to show the springs. Fig. 2 is a cross-sectional view of the tire on a larger scale, and Fig. 3 is an elevation of a wire rod or ring to secure the cover in place.

The improved tire comprises a hollow metal felly on which are secured a series of springs 2 by means of bolts 3 and unscrewable nuts. Each spring 2 is composed of several thin steel plates superposed and curved all in the same manner and together, as shown in Fig. 2. The ends of the said springs are curved toward each other at the outside and then bent inwardly at 4 parallelly with each other.

The tire is provided with a tread portion composed of a rubber rim 6 and of a leather rim 7, cemented one to the other. The rubber rim is T-shaped in cross-section and its median rib is fitted in between the ends 4 of the springs 2, while the lateral portions spread onto the periphery of the series of springs 2.

Within the springs 2 are secured, by means of bolts 3, other and smaller springs 5, which may also be composed of superposed steel plates and which are curved into C shape, their convexity being turned toward the outside of the circle of the wheel. The said springs may also be of O shape, as shown in dotted lines in Fig. 2. When free, the inner edge of the rim 6 lies at a certain distance from the springs 5; but under the influence of a sufficient load it is enabled to bear against the same in order to deaden the shocks or jolts.

8 designates a rubber cloth or other flexible and impermeable cover which is placed around the series of springs 2. In order to avoid any solution of continuity in the said cover, it is made sufficiently wide to fold over the rib of the rim 6 between the ends 4, as shown in Fig. 2.

Bolts 9 with unscrewable nuts secure the ends 4, the cover 8, and the rim 6 together, the said members thus being rendered coactive. The edges of the cover 8 are also securely fixed to the edges or rims of the hollow felly in the grooves 10, formed in the said edges by means of the wire rings 11. Each of the said rings is composed of several parts, (see Fig. 3,) the ends of which are screw-threaded in opposite directions, so as to be brought together or moved away from each other at will by means of nuts 12, having right-hand and left-hand threads; but any other suitable means may be used to secure the cover to the felly and to hold it thereon.

The tire thus constituted is applicable to all kinds of vehicle-wheels. It is flexible and strong and possesses the same elasticity as pneumatic tires and is much more lasting than the latter.

I claim—

In an elastic tire for all kinds of wheels the combination of a felly, spring-plates secured transversally on the felly and having their lateral portions curved outward and toward each other, their ends being bent inward toward the center of the wheel, a tread-rim of flexible material and T-shaped in cross-section, the median rib of which is engaged between the ends of the spring-plates and the lateral portions of which spread on the curved outer portions of the said spring-plates, and flat springs curved into C or O shape secured within the said curved spring-plates and extending under and at a certain distance below the inner edge of the tread-rim so that the said rim shall come and bear on the said inner springs when it is pressed toward the center of the wheel, and a cloth cover spreading on the lateral portions of the said spring-plates and having its middle engaged between the ends of the latter so as to fold under and surround the median rib of the tread-rim.

In testimony that I claim the foregoing as my invention I have signed my name in presence of two subscribing witnesses.

VICTOR EDOUARD BELLEDIN.

Witnesses:
J. W. CAULDWELL,
MAURICE ROUX.